United States Patent
Porte

(10) Patent No.: US 6,824,175 B2
(45) Date of Patent: Nov. 30, 2004

(54) DEVICE FOR INDICATING INCORRECT CLOSURE OF LOCKING MEANS LOCATED BETWEEN TWO FAN COWLINGS OF AN AIRCRAFT ENGINE NACELLE

(75) Inventor: Alain Porte, Colomiers (FR)

(73) Assignee: Airbus France, Toulouse Cedex (FR)

( * ) Notice: Subject to any disclaimer, the term of this patent is extended or adjusted under 35 U.S.C. 154(b) by 18 days.

(21) Appl. No.: 10/308,882

(22) Filed: Dec. 2, 2002

(65) Prior Publication Data

US 2004/0104583 A1 Jun. 3, 2004

(30) Foreign Application Priority Data

Nov. 27, 2001 (FR) .............................. 01 15300

(51) Int. Cl.[7] .................................................. E05C 5/00
(52) U.S. Cl. ............................... 292/113; 292/DIG. 65; 244/129.4
(58) Field of Search ............................ 292/24, 25, 26, 292/29, 113, DIG. 65; 244/53 R, 54, 53 B, 122 AF, 129.4, 132

(56) References Cited

U.S. PATENT DOCUMENTS

| 3,194,595 | A | * | 7/1965 | Wheeler | 292/113 |
|---|---|---|---|---|---|
| 4,086,670 | A | | 5/1978 | Krause et al. | 4/295 |
| 4,365,775 | A | | 12/1982 | Glancy | 244/53 |
| 4,428,609 | A | * | 1/1984 | Baehr | 292/251 |
| 4,531,769 | A | | 7/1985 | Glancy | 292/113 |
| 4,613,099 | A | * | 9/1986 | Smith | 244/53 R |
| 4,679,750 | A | | 7/1987 | Burhams | 244/129 |
| 5,518,206 | A | * | 5/1996 | Arnold | 244/129.4 |
| 5,915,765 | A | * | 6/1999 | Sternberger | 292/256.69 |
| 6,042,156 | A | * | 3/2000 | Jackson | 292/26 |
| 6,148,607 | A | * | 11/2000 | Baudu | 60/226.2 |
| 6,220,546 | B1 | * | 4/2001 | Klamka | 244/129.4 |
| 6,279,971 | B1 | * | 8/2001 | Dessenberger | 292/113 |

FOREIGN PATENT DOCUMENTS

EP   1 099 629   7/2000   ........... B64D/29/06

* cited by examiner

Primary Examiner—Gary Estremsky
(74) Attorney, Agent, or Firm—Thelen Reid & Priest, LLP

(57) ABSTRACT

The invention concerns a device (16) for indicating incorrect closure of locking means consisting of a plurality of locking mechanisms (14) located between two fan cowlings (6) of an aircraft engine nacelle, the device including a body able to adopt, relative to the cowlings, a retracted position as well as a protruding position providing a warning of incorrect closure. According to the invention, the body of the device is able to cover at least partially at least two locking mechanisms (14) when it is in its retracted position, the retracted position being exclusively anthorised when each locking mechanism able to be at least partially covered by the body of the device is locked.

12 Claims, 7 Drawing Sheets

DEVICE FOR INDICATING INCORRECT CLOSURE OF LOCKING MEANS LOCATED BETWEEN TWO FAN COWLINGS OF AN AIRCRAFT ENGINE NACELLE

This application is claims priority of French application no. 01 15300 which was filed on Nov. 27, 2001, and was not published in English.

FIELD OF THE INVENTION

The invention concerns a device for indicating incorrect closure of locking means, consisting of a plurality of locking mechanisms located between two fan cowlings of an aircraft engine nacelle.

Such a device may in particular be used to immediately indicate incorrect closure of these cowlings to ground personnel.

BACKGROUND OF THE INVENTION

The engine nacelles are typically equipped with cowlings, which can be opened, on the ground, to provide access to various items of equipment, systems, etc., for maintenance purposes. When the aircraft is in flight, the cowlings are closed and are shaped such as to provide aerodynamic continuity for the engine as a whole.

More specifically, the nacelles for twin-spool turbofan engines are equipped with at least a pair of fan cowlings, respectively on the right hand and left hand sides, surrounding the fan of the engine. Each of these cowlings exhibits a cross-section which is approximately C-shaped as viewed on a transverse plane perpendicular to the engine longitudinal axis. A hinge is provided along the top edge of each cowling to enable it to articulate from the top of the engine. Due to this arrangement, it is possible to gain access to the various equipment items of the engine, in particular for maintenance purposes, by raising the cowlings.

Additionally, the bottom edges of the cowlings are equipped with locking mechanisms for securing together the cowlings in their closed position when these mechanisms are locked. These locking mechanisms generally include a male part and a female part, mounted on the respective bottom edges of the cowlings, such as to be able to mate when the cowlings are closed.

In flight, several factors generate centrifugal forces acting on the cowlings. For example, the aerodynamic flow over the cowlings, possible overpressure caused by burst pipes inside the engine, or the presence of ventilation devices can be cited.

In consequence, the locking mechanisms are intended to withstand such forces in order to maintain the fan cowlings secured to the engine. For safety reasons, the number of mechanisms fitted is generally greater than the number required to withstand the loads generated by such centrifugal forces.

U.S. Pat. No. 4,531,769 concerns an advanced locking mechanism for securing together the two cowlings surrounding an aircraft engine. This mechanism, of the hook latch type, includes a main hook articulated from the bottom edge of a first cowling, in order to penetrate inside the corresponding opening provided on the other cowling. The position of the main hook is secured by the use of a second hook. The mechanism is locked by pushing on a handle.

When such a locking mechanism is installed on an aircraft engine, it is possible for the operator responsible for closing the cowlings, to omit to lock the mechanism, or to lock it incorrectly. In fact, when a locking mechanism such as that described in U.S. Pat. No. 4,531,769 is used, it is possible to actuate the handle in the direction for closure whilst the hook is not engaged in the corresponding opening provided on the other cowling. In such case, as in the case when the operator omits to actuate the locking mechanism after lowering the cowlings, it is nearly impossible to see that the locking has been omitted or incorrectly performed. In fact, due to their considerable weight, the cowlings automatically position themselves by gravity and their bottom edges hardly extend below the air intake. Moreover, the existing locking mechanisms do not incorporate any truly protruding parts which could indicate incorrect closure to the operator.

In European Patent application N°0,596,070, this problem has been resolved by installing on the bottom edge of one of the two cowlings, a pivoting or sliding arm which hangs down visibly under the engine when the two cowlings are lowered but not secured. The incorrect closure indication can be further improved by adding a flag to the end of the pivoting or sliding arm.

According to this document, the securing of the cowlings can only be achieved after the operator has manually raised the arm and stowed it in a receptacle provided for the purpose. When the locking is performed, a pin mounted on the opposite cowling penetrates into the arm to secure it in the retracted position. When the cowlings are unlocked, a spring automatically deploys the arm in the protruding position, which is visible from outside.

However, this indicator does present a certain number of disadvantages.

First of all, in the most frequent case, where the engine is mounted beneath the aircraft wing, the cowling locking mechanism is located beneath the engine, in a position very close to the ground and therefore awkward to access. When the operator opens or closes the cowlings, he must squat down in order to operate the locking mechanisms. The arm added to the locking mechanism then constitutes a protrusion in addition to the blunt parts of the engine which may injure the operator.

Additionally, when closing the cowlings, the indicator described in European Patent application N°0,596,070 involves the operator raising an arm whilst securing together the cowlings. In the position in which he finds himself, this operation can be particularly fastidious and difficult to perform.

Moreover, the indicator described in this document significantly complicates the existing locking mechanisms, since it requires alignment between the pin which locks the arm in the retracted position and the hole provided in the arm to accommodate this pin. This operation may be fastidious, in view of the wear and tear to which the parts are subjected in use.

Also, the indicator described in this document is not able to indicate an incorrect closure of all of the mechanisms involved for securing together the engine cowlings.

Indeed, the indicator is liable to move from its retracted position to its protruding position, only if none of the locking mechanisms are engaged.

In flight, however, in order to ensure the cowlings are secured together, it is habitually necessary to provide a plurality of locking mechanisms, in order to avoid any possibility of the engine cowlings being torn off.

However, in the document presented above, when only one of the locking mechanisms is engaged, it is sufficient to prevent the device from indicating incorrect closure, without any attention being drawn to the state of all the other mechanisms. This is particularly worrying in that it is possible for this to lead to situations where the ground personnel are not made aware of inadequate locking to secure the cowlings in flight.

European Patent application N°1,099,629 describes an incorrect closure indicator for locking means which includes retractable stop means which automatically hold the two cowlings apart, when the cowlings are moved from the open position to the closed position.

Although this addresses the main disadvantages of the device described in European Patent application N°0,596,070, this indicator does introduce a similar disadvantage to one of those associated with European Patent application N°0,596,070.

The disadvantage is that associated with the inability of the indicator to detect incorrect closure occurring on any mechanism of the locking means. Indeed, once the indicator has been manually operated to allow closure of the locking means, the indicator is no longer able to provide any indication of the state of the various locking mechanisms.

Finally, in European Patent application N°1,099,629, the indicator does not provide a sufficiently visible gap betwean the cowlings for the ground personnel to be able to detect incorrect closure of these cowlings. In consequence, the aircraft may take-off without the engine cowlings being correctly closed and secured together.

SUMMARY OF THE INVENTION

The invention is therefore intended to present a device for indicating incorrect closure of locking means consisting of a plurality of locking mechanisms located between two fan cowlings of an aircraft engine nacelle, this indicating device at least partially addresses the disadvantages described above with respect to indicators in accordance with the previous state of the art.

More precisely, the present invention is intended to propose an indicator device which provides a more reliable and better warning than that provided by the indicators in accordance with the previous state of the art.

To do this, the invention provides a device for indicating incorrect closure of locking means consisting of a plurality of locking mechanisms located between two fan cowlings of an aircraft engine nacelle, the device includes a body able to adopt, relative to the cowlings, a retracted position as well as a protruding position providing a warning of incorrect closure. According to the invention, the body of the device is able to cover at least partially at least two locking mechanisms when it is in its retracted position, the retracted position being exclusively authorised when each locking mechanism is able to be at least partially covered by the body of the device is locked.

Advantageously, when the two fan cowlings are spread apart, incorrect closure is indicated visually by the body of the indicator device. Moreover, the indicator device in accordance with the invention is designed such that if any of the locking mechanisms with which it is directly associated is incorrectly locked, the body of the device indicating incorrect closure cannot adopt the retracted position, and consequently obliges the operator to correctly lock each of the associated locking mechanisms that are unlocked. Therefore, as long as every locking mechanism associated with the indicator device is not properly locked, the body of the device cannot be folded to the retracted position in which it covers at least partially each of the associated mechanisms, and remains in a protruding position warning of incorrect closure.

Advantageously, although the body of the indicator device may be located underneath an aircraft engine, as described in European Patent application N°0,596,070, its shape and its dimensions may be adapted to make it easily visible by an operator performing various tasks in the vicinity of the engine.

Preferentially, each of the locking mechanisms not locked and able to be at least partially covered by the body of the device constitutes a stop for the body, when moving it from its protruding position to its retracted position.

Preferentially, in its retracted position, the body of the device covers at least partially each one of the locking mechanisms which constitute the locking means, and is in contact with at least one of the two cowlings. In this way, by associating all the locking mechanisms to the indicator device, this device is capable of indicating incorrect closure if any one of the mechanisms constituting the locking means is incorrectly locked, thus enhancing the safety level provided by such a device.

According to a preferred embodiment of the invention, the body of the device is mounted freely articulated at one end of one of the two fan cowlings. Moreover, this indicator device includes closing means able to secure the body of the device to the other of the two fan cowlings.

The body of the device may therefore include a first part intended to cover each of the locking mechanisms when the body of the device is in its retracted position, and a second part intended to warn of incorrect closure when the body of the device is in its protruding position. Of course, if the indicator device is not associated with all the locking mechanisms constituting the locking means, but only with a certain number of them greater than or equal to two, the first part of the body of the device is then intended to cover only those concerned locking mechanisms.

According to another preferred enbodiment of the invention, the body of the device is mounted freely articulated from a part external to the two fan cowlings. Moreover, the device includes closing means able to secure the body of the device to at least one of these two fan cowlings.

In such case, the body of the device is intended on the one hand to cover each one of the locking mechanisms when the body of the device is in its retracted position, and on the other hand to warn of incorrect closure when the body of the device is in its protruding position.

Finally, the body of the device is apt to cover a predetermined number greater than or equal to two locking mechanisms, this number being adequate to withstand the loads generated by the aerodynamic flow encountered in flight. Thus the indicator device may be advantageously applied to a predetermined and limited number of locking mechanisms, according to the pertaining safety requirements.

Other advantages and characteristics of the invention will become evident from the following detailed description of the drawings when read in connection with the accompanying drawings which illustrate preferred embodiments of the invention.

DETAILED DESCRIPTION OF THE PREFERRED EBODIMENTS OF THE INVENTION

Figure 1:
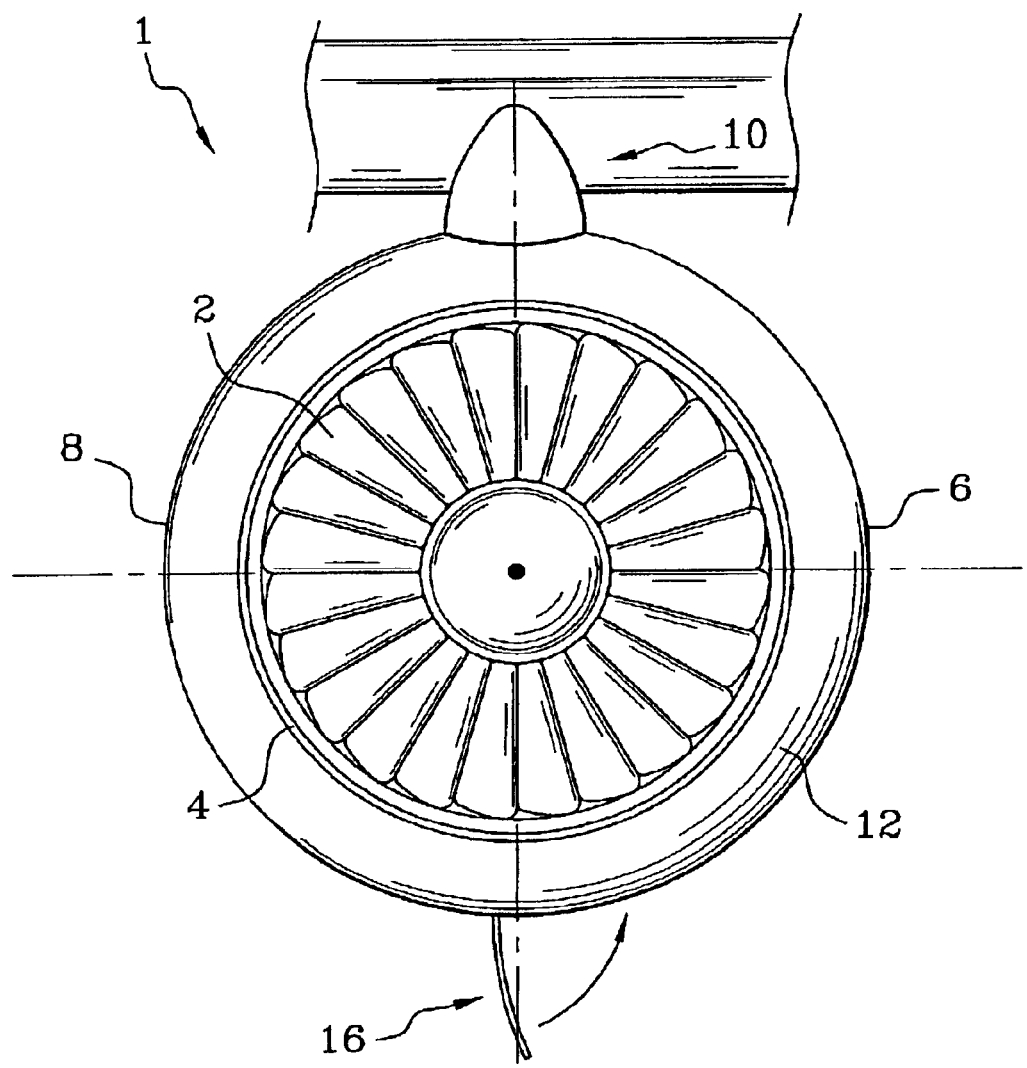
FIG. 1 represents a schematic front view of a turbofan engine whose nacelle is fitted with an indicator device in accordance with a first preferred embodiment of the invention, the body of the device being in its protruding warning position and the fan cowlings of the nacelle being folded down.

As can be seen in FIG. 1, the nacelle (1) of a turbofan is habitually lined on the inside, in the region of a fan (2), by a fan case (4). Additionally, the nacelle (1) is enclosed on the outside, by two fan cowlings (6) and (8) respectively forming the left hand and right hand cowlings. Each of these left hand (6) and right hand (8) cowlings is roughly C-shaped or semi-circular in transverse section in a plane perpendicular to the engine longitudinal axis.

Cowlings (6) and (8) are each articulated from a pylon (10) from which the engine is suspended, under the aircraft wing. More precisely, the top edge of each of the cowlings (6) and (8) is attached to the pylon (10), at the top of the engine, by a hinge (not shown) whose axis is approximately parallel to the longitudinal axis of the engine. This particular arrangement enables each of the cowlings (6) and (8) to be raised in order to provide access to the various equipment items (not shown) of the engine, conventionally mounted in an annular space (12) inside the nacelle (1), between the fan case (2) and the left hand (6) and right hand (8) cowlings.

Figure 2:
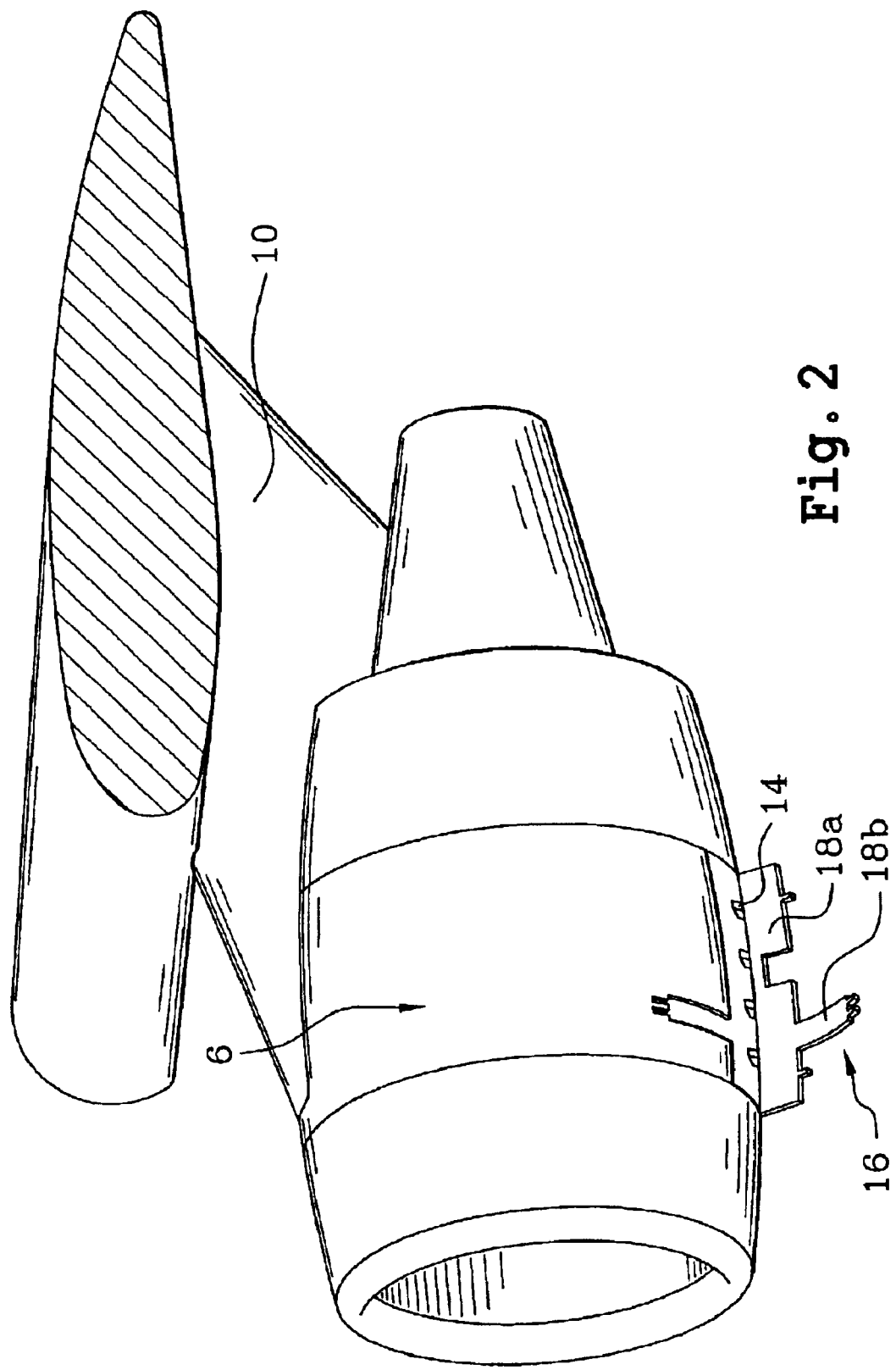
FIG. 2 represents a schematic view in perspective of a turbofan engine whose nacelle is equipped with an indicator device in accordance with the first preferred embodiment of the invention, the body of the device being in its protruding warning position and the nacelle fan cowlings being folded down.

When the cowlings (6) and (8) are closed, they are normally secured together by locking means, these locking means consisting of a plurality of locking mechanisms (14) represented schematically in FIG. 2. These mechanisms (14) are of the hook latch type or similar, and are comparable to those described in U.S. Pat. No. 4,531,769, located between the bottom edges of the cowlings (6) and (8).

In order to avoid an operator forgetting to lock these locking means or locking them incorrectly, a device for indicating an incorrect closure is added to the nacelle (1), this indicator device being designated in general by reference number (16).

It should first be stated that as opposed to the previous state of the art, the indicator device (16) is applied to a predetermined number of locking mechanisms (14) belonging to the locking means, this number varying between two and all of the locking mechanisms. Additionally, it should be noted that the predetermined number of these mechanisms (14) is dependent on environmental conditions, and may be adapted according to the pertaining requirements. In general, it can be said that the total number of mechanisms (14) is increased in order to allow for the failure of one or several of these locking mechanisms (14) in flight.

According to a first preferred embodiment of the invention, and referring to FIGS. 1 and 2, it can be seen a device (16) for indicating incorrect closure of locking means consisting of a plurality of locking mechanisms (14), these mechanisms (14) being located between the left hand fan cowling (6) and the right hand fan cowling (8) of the nacelle (1). More precisely, in this first preferred embodiment of the invention, the indicator device (16) is applied to all of the locking mechanisms (14) constituting the locking means of the cowlings (6) and (8) of the nacelle (1), whereas as already explained above, the indicator device (16) could also be applied to a limited number of the locking mechanisms (14), still greater than or equal to two.

The indicator device (16) including a first part (18a) and a second part (18b), the first and second parts (18a) and (18b) being joined together, and manufactured indifferently in one piece or as two distinct parts rigidly assembled together by welding means or similar. The first part (18a) of the body (18) is roughly rectangular in shape, whose longer dimension extends parallel to the longitudinal axis of the engine, whilst the second part (18b) of the body (18), which is also roughly rectangular, has its longer dimension extending approximately perpendicular to the engine longitudinal axis. Also, it is noted that the first and second parts (18a) and (18b) are preferentially in the form of a simple thin gauge sheet.

Figure 3:
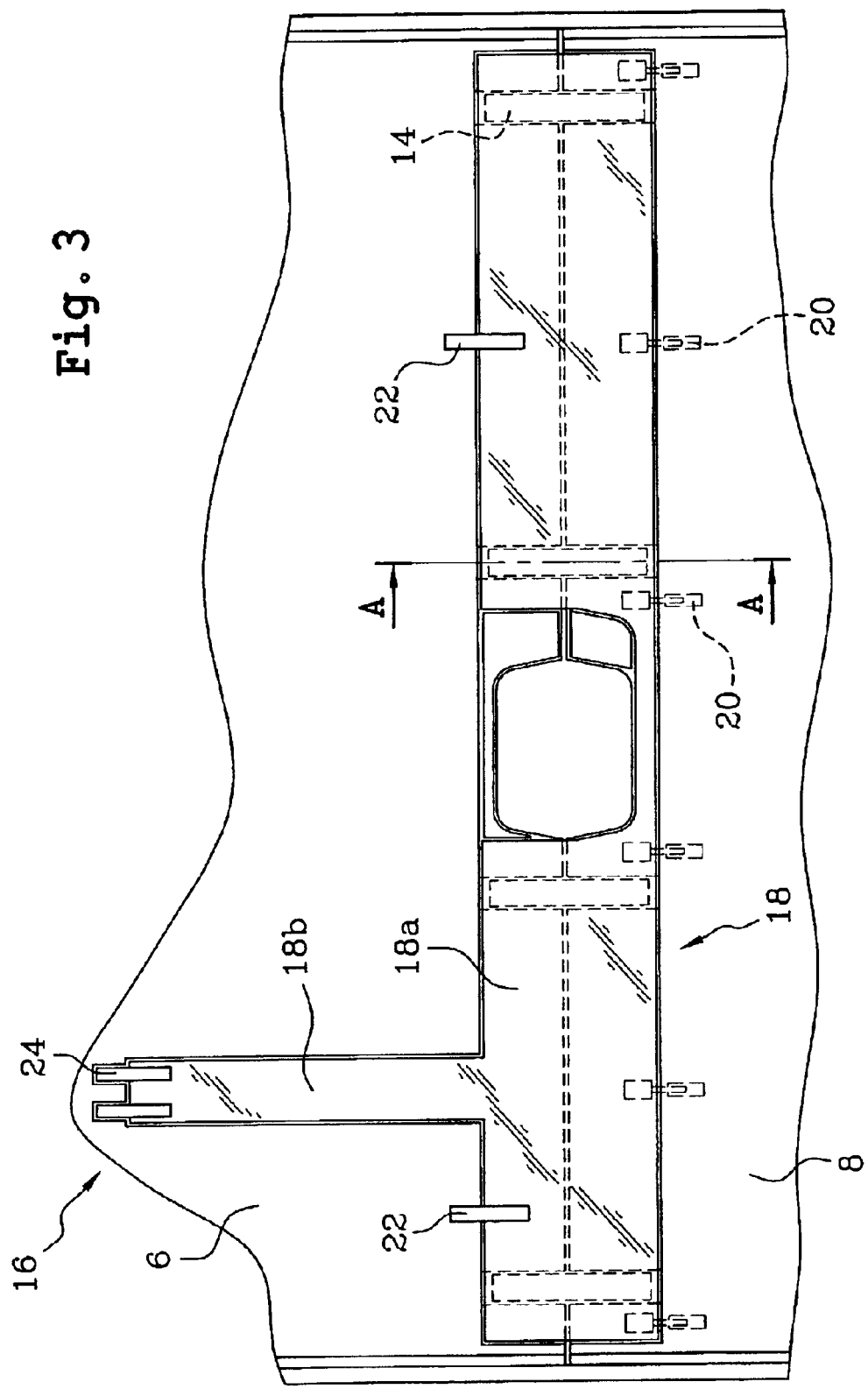
FIG. 3 represents a partial view from below, at a larger scale, of a turbofan engine nacelle equipped with an indicator device in accordance with the first preferred embodiment of the invention, the body of the device being in its retracted position.

The indicator device (16) is equipped with hinges (20) or similar devices enabling the first part (18a) of the body (18) to be mounted freely articulated on one of the cowlings (6) and (8). As shown in FIGS. 1 to 3, the remainder of the description of this preferred embodiment will be given for the case where the hinges (20) are attached to the bottom of the right hand cowling (8), the axis of these hinges being approximately parallel to the engine longitudinal axis.

The indicator device (16) also includes closure means (22) and (24), these closure means being used to secure the body (18) to the cowlings (6) and (8). The closing means (22) and (24) include a series of first mechanisms (22) intended to mate with the first part (18a) of the body (18), as well as a series of second mechanisms (24) intended to mate with the second part (18b) of the same body (18). It should be noted that the first and second closing mechanisms (22) and (24) are of the same type as the locking mechanisms (14), and preferably of smaller size.

The indicator device (16) is able to operate as follows.

When the two fan cowlings (6) and (8) are in an open position, and consequently held apart (position not shown), the body (18), which is freely articulated by its part (18a), hangs down beneath the bottom edge of the right hand cowling (8), to indicate by its second part (18b) incorrect closure of the locking mechanisms (14). It should be noted that the shape and the dimensions of this second part (18b) are adjusted such that the body (18) can be easily seen by an operator in the vicinity of the nacelle (1). As such, it must be pointed out that each of the parts (18a) and (18b) of the body (18) is provided with a surface area which is much larger than that of the locking mechanism (14).

During handling operations on the engine, it is possible to provide means (not shown) to raise the body (18) hanging beneath the right hand cowling (8), in order to avoid any danger of causing injury to the operator alongside. For instance, it is possible to use a strut which can be attached to the right hand cowling (8) of the nacelle (1).

Once the various operations are completed, the fan cowlings (6) and (8) are folded downwards in order to be secured together. The position of the left hand and right hand cowlings (6) and (8) is then similar to that shown in FIGS. 1 and 2.

Moreover, the body (18) of the indicator device (16) takes up a protruding position relative to the cowlings (6) and (8), this position making it easily visible to an operator in the vicinity of the engine, in order to warn him of incorrect closure. Note that the second part (18b) of the body (18) may also include means to enhance its visibility. For example it may be painted in bright colours or a flag may be added.

The second part (18b) of the body (18) is now hanging down visibly beneath the engine, roughly perpendicular to the ground, and indicates to the ground personnel that the various locking mechanisms (14) have not yet been checked, or quite simply that they have not yet been locked. Consequently, as long as the various locking mechanisms (14) have not been locked, the second part (18b) of the body (18) of the indicator device (16) remains in its protruding warning position, indicating that the aircraft is not ready for flight.

Thus, the operator must operate all the locking mechanisms (14) located between the left hand (6) and right hand (8) cowlings.

When the mechanisms (14) have been locked by the operator, the body (18) is moved from its protruding position to a retracted position, this retracted position corresponding to the position in which the aircraft is fit for flight, and indicating that there is no closure problem with any of the various locking mechanisms (14).

When the body (18) is in the retracted position relative to cowlings (6) and (8), the first part (18a) of the body (18) totally covers each one of the locking mechanisms (14), and is in contact with the two cowlings (6) and (8). Of course, whilst remaining within the context of the invention, the first part (18a) of the body (18) could be designed such that it only partially covers each of the locking mechanisms (14), when the body (18) is in the retracted position.

Thus, if at least one of these locking mechanisms (14) has not yet been or is incorrectly locked, the first part (18a) of the body (18), during displacement of the body (18) from its protruding position to its retracted position, butts against the mechanism(s) not locked.

In other words, the retracted position of the body (18) of the indicator device (16) is exclusively authorised if each locking mechanism (14) directly associated with the indicator device (16) is locked. Naturally, a directly associated locking mechanism (14) is intended to mean the mechanisms (14) for which the indicator device (16) applies, i.e. the mechanisms (14) likely to be at least partially covered by the body (18) of the device (16), since as already stated, the indicator device (16) could be applied to a limited number of mechanisms (14) only, located between the cowlings (6) and (8).

The fact that the body (18), and more specifically the first part (18a) of the body (18), butts against the mechanism(s) not engaged, makes it possible to prevent attachment of the indicator device (16) on the left hand cowling (6). The operator is thus warned of the existence of incorrect closure of at least one of the locking mechanisms (14) covered by the first part (18a) of the body (18). The operator must therefore resolve all the problems present in order to be able to secure the body (18) using the closing means (22) and (24).

Figure 4:
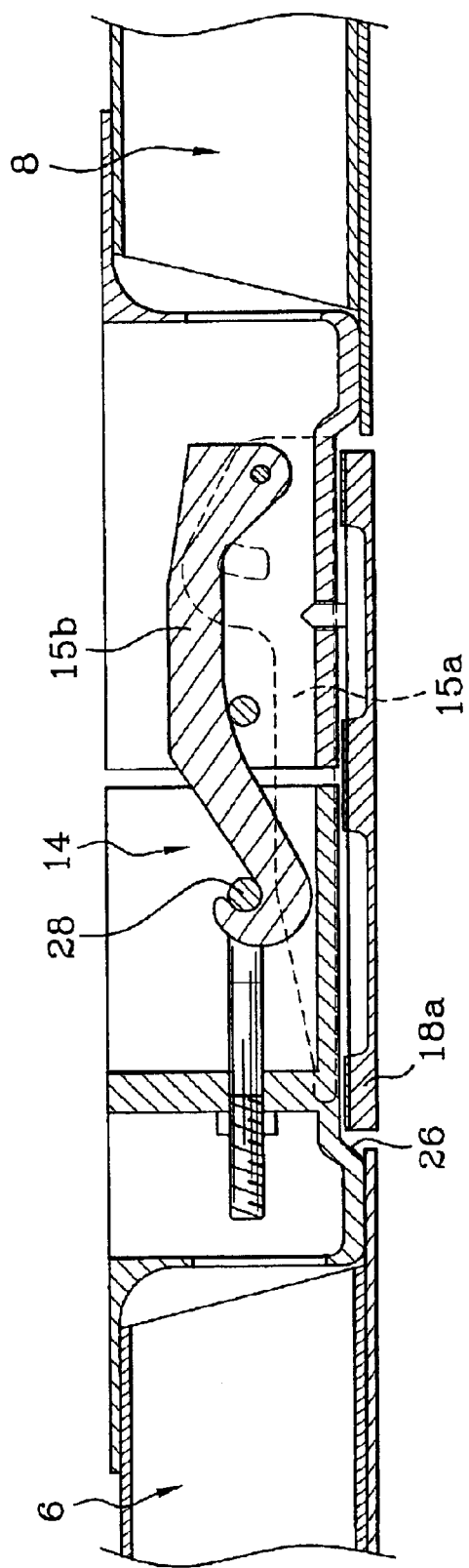
FIG. 4 represents a partial view of a section along line A—A of FIG. 3.

Referring to FIG. 4, it can be seen a locking mechanism (14) conventionally used on an aircraft engine between the two fan cowlings (6) and (8), this mechanism (14) including a handle (15a) (shown dotted) articulated from the right hand cowling (8), and equipped with an articulated hook (15b). In FIG. 4, the locking mechanism (14) is shown in its locked configuration. In such a position, the handle (15a) is folded fully down, such that it does not protrude out of its recess (not shown) in which it is intended to be stowed. Moreover, when the locking mechanism is locked, the hook (15b) mates with a mortise (28) located on the left hand cowling (6), and the handle (15a) lies in its most folded position possible inside its recessed housing.

The first part (18a) of the body (18) is able to fit, when the body (18) is in its retracted position, in a recess (26) provided in the cowlings (6) and (8), in order to preserve the outer profile of the external surfaces over the cowlings (6) and (8) and over the body (18) of the indicator device (16).

The recess (26) and the thickness of the first part (18a) of the body (18) are specially designed such that if the handle (15a) is not fully folded into its recess, it stands proud of the recess (26), and consequently acts as a stop for the body (18) of the indicator device (16), when this body (18) is moved from its protruding position to its retracted position.

Figure 5:
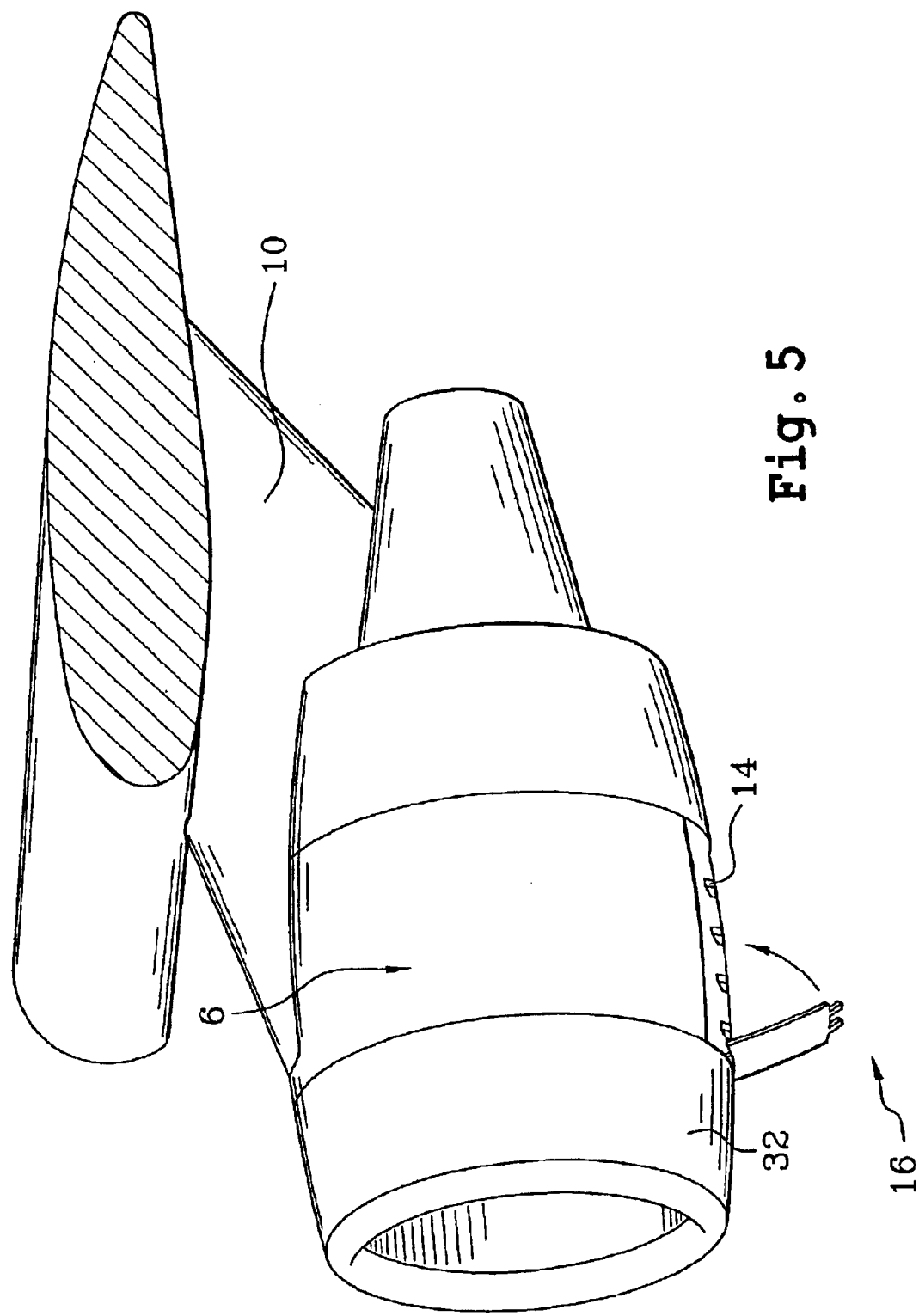
FIG. 5 represents a schematic view in perspective of a turbofan engine whose nacelle is equipped with an indicator device in accordance with a second preferred embodiment of the invention, the body of the device being in the protruding warning position and the nacelle fan cowlings being folded down.
Figure 6:
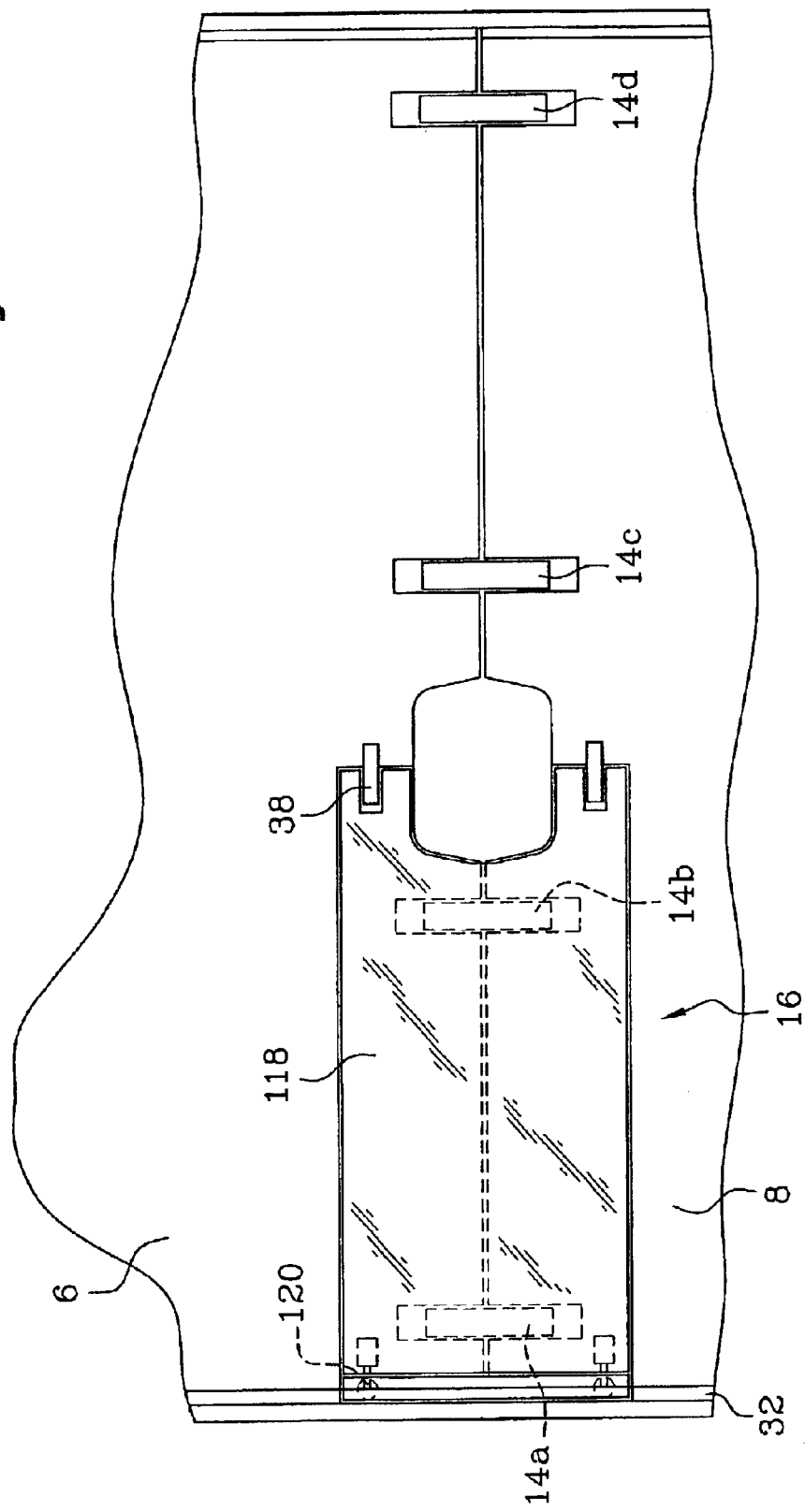
FIG. 6 represents a partial view from below, at a larger scale, of a turbofan engine nacelle equipped with an indicator device in accordance with the second preferred embodiment of the invention, the body of the device being in its retracted position.

According to a second preferred embodiment of the invention and referring to FIGS. 5 and 6, it can be seen a device (16) for indicating an incorrect closure of locking means consisting of a plurality of locking mechanisms (14) located between a left hand fan cowl (6) and a right hand fan cowling (8) of the nacelle (1). More precisely, in this second preferred embodiment of the invention, the indicator device (16) is applied to only two of the four locking mechanisms which constitute the locking means for the cowlings (6) and (8) of the nacelle (1). Referring to FIG. 6, the indicator device (16) is applied to two locking mechanisms (14a) and (14b), whereas the other two locking mechanisms (14c) and (14d) are not subjected to any check. Consequently, if they are either not or incorrectly actuated, mechanisms (14c) and (14d) do not result in any incorrect closure warning.

Indeed, in this second preferred embodiment, it was considered that two correctly locked locking mechanisms (14a) and (14b) were sufficient to prevent the cowlings (6) and (8) from being torn off in flight, due to the loads generated by the aerodynamic flow over the cowlings (6) and (8).

The indicator device (16) includes a body (118) of roughly rectangular shape, whose longer side extends along a direction parallel to the engine longitudinal axis. Additionally, the body (118) of the device (16) preferentially takes the form of a simple thin gauge sheet.

The indicator device (16) is equipped with hinges (120) or similar devices enabling the body (118) to be mounted freely articulated from an external part of the cowlings (6) and (8). This may be, as shown in FIGS. 5 and 6, from the engine air intake (32). Note that the hinges (120) are attached to the engine air intake (32), the axis of these hinges (120) being approximately perpendicular to the engine longitudinal axis.

The indicator device (16) also includes closing means (38), these closing means being able to secure the body (118) to at least one of the fan cowlings (6) and (8), and preferably to both. These closing means (38) are identical to the closing means (22) and (24) described above, in the first preferred embodiment of the invention.

The indicator device (16) according to the second preferred embodiment of the invention is able to operate in a similar way to that of the indicator device according to the first preferred embodiment of the invention.

For these reasons it should merely be stated that the only notable difference between these two preferred embodiments of the invention, resides in the structure of the bodies (18) and (118) of the indicator device (16). Indeed, whereas the body (18) which is used in the first preferred embodiment consists of two distinct parts (18a) and (18b), the body (118) used in the second preferred embodiment is intended on the one hand to cover the locking mechanisms (14a) and (14b) when the body (118) is in its retracted position, and on the other hand to provide a warning of incorrect closure if the body (118) is in its protruding position. The body (118) providing a double function, thus exhibits a simplified structure relative to the structure of the body (18) of the first preferred embodiment of the invention.

Figure 7:
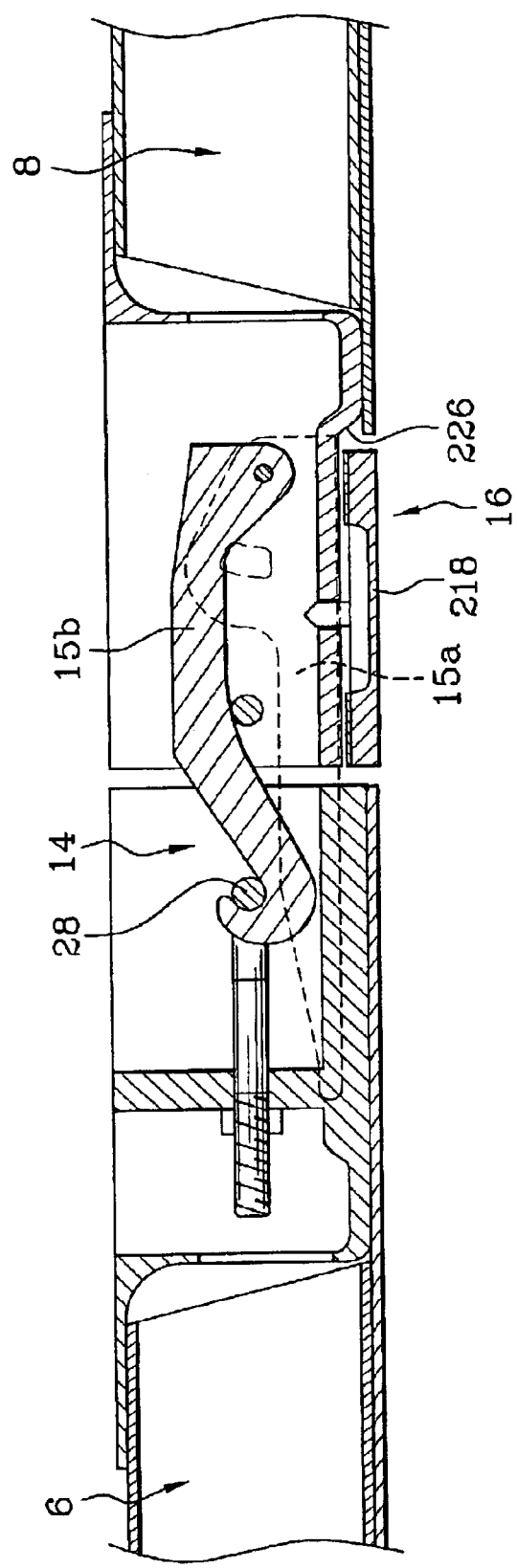
FIG. 7 represents a partial front section view of a turbofan engine nacelle equipped with an indicator device according to a third preferred embodiment of the invention, the body of the device being in its retracted position.

According to a third preferred embodiment of the invention, and referring to FIG. 7, the indicator device (16) includes a body (218), which may be articulated indifferently from one of the cowlings (6) and (8) or from a part external to the fan cowlings (6) and (8), as described respectively under the first and second preferred embodiments of the invention. Similarly, the body (218) may cover a specified number of locking mechanisms (14), this number varying between two and all the mechanisms (14) present between the two cowlings (6) and (8).

As can be seen in FIG. 7, the body (218), corresponding to the body (18a) of the first preferred embodiment and to the body (118) of the second preferred embodiment, mates with only one of the cowlings (6) and (8), and only partly covers each locking mechanism(14). Because of this, only one of the left hand (6) or right hand cowlings (8) needs to be adapted to accommodate the body (218) of the indicator device (16), in order to allow it to take up its retracted position. Note that the single cowling (8) concerned contains a recess (226) whose dimensions are intended such that the handle (15a) of the mechanism (14) constitutes a stop for the body (218), as it is moved from its protruding position to its retracted position and if the mechanism (14) has not been locked.

Changes may be made in the construction and arrangement of the parts or elements of the embodiments as described herein without departing from the spirit or scope of the invention defined in the following claims.

What is claimed is:

1. A locking assembly for securing two fan cowlings (6, 8) of an aircraft engine nacelle, said locking assembly comprising:
    a locking means consisting of a plurality of locking mechanisms (14, 14a, 14b) located between said fan cowlings (6, 8), each locking mechanism having a handle (15a); and
    a device (16) for indicating incorrect closure of said locking means, said device (16) including a body (18, 118, 218) able to adopt, relative to said cowling (6, 8), a retracted position as well as a protruding position, the protruding position providing a warning of incorrect closure;
    wherein said body (18, 118, 128) in its retracted position is able to cover at least partially two of the locking mechanisms (14, 14a, 14b) spaced along a longitudinal axis of the engine, and wherein said retracted position is exclusively authorized when each of the locking mechanisms (14, 14a, 14b) that are able to be at least partially covered by the body (18, 118, 218) is locked.

2. A locking assembly according to claim 1, characterized in that each of the locking mechanisms (14, 14a, 14b) not locked and able to be at least partially covered by the body (18, 118, 218) of the device (16) constitutes a stop for the body (18, 118, 218), when moving the body from its protruding position to its retracted position.

3. A locking assembly according to claim 1, characterized in that with the body in its retracted position, the body (18, 118, 218) of the device (16) covers at least partially each one of the locking mechanisms (14, 14a, 14b) which constitute the locking means and is in contact with at least one of the said two cowlings (6, 8).

4. A locking assembly according to claim 3, characterized in that said body (18) of the device (16) is mounted freely articulated from one end of one of said two cowlings (6, 8).

5. A locking assembly according to claim 4, characterized in that the device (16) includes closing means (22, 24) able to secure the said body (18) of the device (16) to the other of said two cowlings (6, 8).

6. A locking assembly according to claim 1, characterized in that said body (18) of the device includes a first part (18a) intended to cover each of the locking mechanisms (14) constituting the locking means when said body (18) of the device (16) is in its retracted position, and a second part (18b) intended to warn of incorrect closure when said body (18) of the device (16) is in its protruding position.

7. A locking assembly according to claim 1, characterized in that said body (118) of the device (16) is mounted freely articulated from an external part (32) of said two cowlings (6, 8).

8. A locking assembly according to claim 7, characterized in that the device (16) includes closing means (38) able to secure said body (118) of the device (16) to at least one of said two cowlings (6, 8).

9. A locking assembly according to claim 8, characterized in that said body (118) of the device (16) is intended on the one hand to cover each one of the locking mechanisms (14a, 14b) constituting the locking means when said body (118) of the device (16) is in its retracted position, and on the other hand to warn of incorrect closure when said body (118) of the device (16) is in its protruding position.

10. A locking assembly according to claim 1, characterized in that the body (18, 118, 218) of the device (16) includes means of enhancing its visibility.

11. A locking assembly according to claim 10, characterized in that each of the locking mechanisms (14, 14a, 14b) able to be at least partially covered by the body (18, 118, 218) of the device (16) includes a movable handle (15a) driving a hook (15b), said handle (15a) constituting, when the locking mechanism (14, 14a, 14b) is not locked, a stop for the body (18, 118, 218) of the device (16) when moving it from its protruding position to its retracted position.

12. A locking assembly according to claim 11, characterized in that the body (18, 118, 218) of the device (16) is able to cover a predetermined number greater than or equal to two locking mechanisms.

* * * * *